(12) United States Patent
Kim et al.

(10) Patent No.: US 10,608,740 B2
(45) Date of Patent: Mar. 31, 2020

(54) METHOD AND APPARATUS FOR VISIBLE LIGHT COMMUNICATION

(71) Applicant: YUYANG DNU CO., LTD., Hwaseong-si Gyeonggi-do (KR)

(72) Inventors: Sangok Kim, Seoul (KR); Byungoh Kim, Suwon-si (KR); Sang-ho Yoon, Suwon-si (KR); Seung-wan Roh, Suwon-si (KR); Seok-joo Koh, Daegu (KR); Sang Il Choi, Daegu (KR)

(73) Assignee: YUYANG DNU CO., LTD. (KR)

( * ) Notice: Subject to any disclaimer, the term of this patent is extended or adjusted under 35 U.S.C. 154(b) by 0 days.

(21) Appl. No.: 16/463,462

(22) PCT Filed: Nov. 24, 2017

(86) PCT No.: PCT/KR2017/013517
§ 371 (c)(1),
(2) Date: May 23, 2019

(87) PCT Pub. No.: WO2018/097643
PCT Pub. Date: May 31, 2018

(65) Prior Publication Data
US 2019/0356386 A1    Nov. 21, 2019

(30) Foreign Application Priority Data
Nov. 24, 2016   (KR) ........................ 10-2016-0157576

(51) Int. Cl.
*H04B 10/116* (2013.01)
*H05B 37/02* (2006.01)
*H04B 10/50* (2013.01)

(52) U.S. Cl.
CPC .......... *H04B 10/116* (2013.01); *H04B 10/50* (2013.01); *H05B 37/0245* (2013.01)

(58) Field of Classification Search
CPC ... H04B 10/116; H04B 10/50; H04B 37/0245
(Continued)

(56) References Cited

U.S. PATENT DOCUMENTS 8,007,127 B2    8/2011   Kim et al.
10,131,365 B2   11/2018  Kim et al.
(Continued)

FOREIGN PATENT DOCUMENTS

KR     101292075 B1    7/2013
KR     1020150106065 A  9/2015

OTHER PUBLICATIONS

Choi, Sang Il et al., "Plasa Standard Protocol Technology for LED Lighting Control", May 2014, The Korean Institute of Illuminating and Electrical Installation Engineers, vol. 28, No. 3, pp. 9-21 (http://www.dbpia.co.kr/Journal/ArticleDetail/NODE02456640).
(Continued)

*Primary Examiner* — Dalzid E Singh
(74) *Attorney, Agent, or Firm* — Harness, Dickey & Pierce, P.L.C.

(57) ABSTRACT

Disclosed are a visible light communication method and apparatus. It is one object of the present disclosure to provide an apparatus for generating data including a visible light communication device management protocol header to allow only a specific terminal to receive data transmitted by a lighting device using visible light communication, and a method therefor.

9 Claims, 8 Drawing Sheets

(58) Field of Classification Search
USPC .......................................................... 398/172
See application file for complete search history.

(56) References Cited

U.S. PATENT DOCUMENTS

| | | |
|---|---|---|
| 10,277,318 B2 | 4/2019 | Kim et al. |
| 2010/0073928 A1 | 3/2010 | Kim et al. |
| 2010/0209105 A1* | 8/2010 | Shin .................... H04B 10/1149 398/58 |
| 2012/0093517 A1 | 4/2012 | Rajagopal et al. |
| 2014/0045549 A1* | 2/2014 | Ryan ..................... H04N 5/3532 455/556.1 |
| 2014/0199078 A1 | 7/2014 | Lim et al. |
| 2015/0262103 A1 | 9/2015 | Kim et al. |
| 2017/0237488 A1* | 8/2017 | Aoyama ................. H04M 11/00 398/118 |
| 2017/0258666 A1 | 9/2017 | Kim et al. |
| 2017/0307382 A1 | 10/2017 | Kim et al. |
| 2018/0065644 A1 | 3/2018 | Kim et al. |
| 2018/0101875 A1 | 4/2018 | Kim et al. |
| 2018/0227052 A1 | 8/2018 | Kim et al. |
| 2018/0276985 A1 | 9/2018 | Kim et al. |
| 2018/0279435 A1 | 9/2018 | Kim et al. |
| 2019/0132000 A1 | 5/2019 | Kim et al. |

OTHER PUBLICATIONS

International Search Report (in English and Korean) and Written Opinion (in Korean) issued in PCT/KR2017/013517, dated Feb. 26, 2018; ISA/KR.

* cited by examiner

METHOD AND APPARATUS FOR VISIBLE LIGHT COMMUNICATION

CROSS-REFERENCE TO RELATED APPLICATIONS

This application is a U.S. National Phase Application under 35 U.S.C. 371 of International Application No. PCT/KR2017/013517, filed on Nov. 24, 2017, which claims priority to Korean Patent Application No. 10-2016-0157576, filed on Nov. 24, 2016. The entire disclosures of the above applications are incorporated herein by reference.

TECHNICAL FIELD

The present disclosure relates to visible light communication, and more particularly, to a method and apparatus for one-to-one communication between a lighting device and a terminal.

BACKGROUND

The statements in this section merely provide background information related to the present disclosure and may not constitute prior art.

Visible light communication is wireless communication technology for transmitting visible light data composed of an on/off signal pattern based on the characteristics of fast response of a lighting device. When visible light communication is applied to a lighting device, the lighting device may transmit data to a terminal through visible light communication.

Due to the characteristics of the lighting device, the lighting device cannot selectively transmit light to the terminal. Accordingly, when the lighting device is to transmit data to a terminal through visible light communication, all terminals within a range within which the terminals can receive light from the lighting device may receive the visible light data. When visible light communication is used to transmit information or provide services to all terminals without limitation, the above-described situation is not a serious problem. However, when it is necessary to transmit information or provide a service to only a specific terminal, as in the case where a channel service is provided, it is inappropriate for the lighting device to transmit data to all terminals within the light receiving range using visible light communication.

Accordingly, there is a need for a method and apparatus for enabling a lighting device to transmit data to a specific terminal using visible light communication.

SUMMARY

Therefore, it is one object of the present disclosure to provide an apparatus for generating data including a visible light communication device management protocol header to allow only a specific terminal to receive data transmitted by a lighting device using visible light communication, and a method therefor.

In accordance with one aspect of the present invention, provided is a server for controlling a lighting device preconfigured to transmit data to a preconfigured terminal, the server including a database configured to store an identifier of one or more lighting devices used for visible light communication and an identifier of a terminal, a data generator configured to generate data of a physical layer including a VLC Device Management Protocol (VDMP) header including an identifier of the preconfigured terminal, information to be transmitted to the preconfigured terminal, and a header of a higher layer, a controller configured to check the identifier of the preconfigured terminal in the database and controlling the data generator to generate the data of the physical layer including the identifier of the preconfigured terminal, and a communication unit configured to transmit the data of the physical layer to the preconfigured lighting device under control of the controller.

In accordance with another aspect of the present invention, provided is a visible light lighting device including a communication unit configured to receive, from a visible light communication (VLC) server, data of a first physical layer to be transmitted to a preconfigured terminal, a data analyzer configured to divide the data of the first physical layer into a header of a higher layer of the first physical layer, information to be transmitted to the preconfigured terminal, and a VLC Device Management Protocol (VDMP) header including an identifier of the preconfigured terminal, and analyzes the VDMP header to check the information included in the VDMP header, a data generator configured to regenerate data of a second physical layer including a VLC header including a part of information included in the VDMP header and the information to be transmitted to the preconfigured terminal, a controller configured to control the data generator to regenerate the data of the second physical layer including the part of the information included in the VDMP header and to control the data of the second physical layer to be transmitted, and a lighting unit configured to modulate the data of the second physical layer into the visible light signal under control of the controller.

As described above, according to an embodiment of the present disclosure, data including a visible light communication management protocol header is generated, and thus only a specific terminal may be allowed to receive the data that a lighting device transmits using visible light communication.

DETAILED DESCRIPTION

Figure 1:
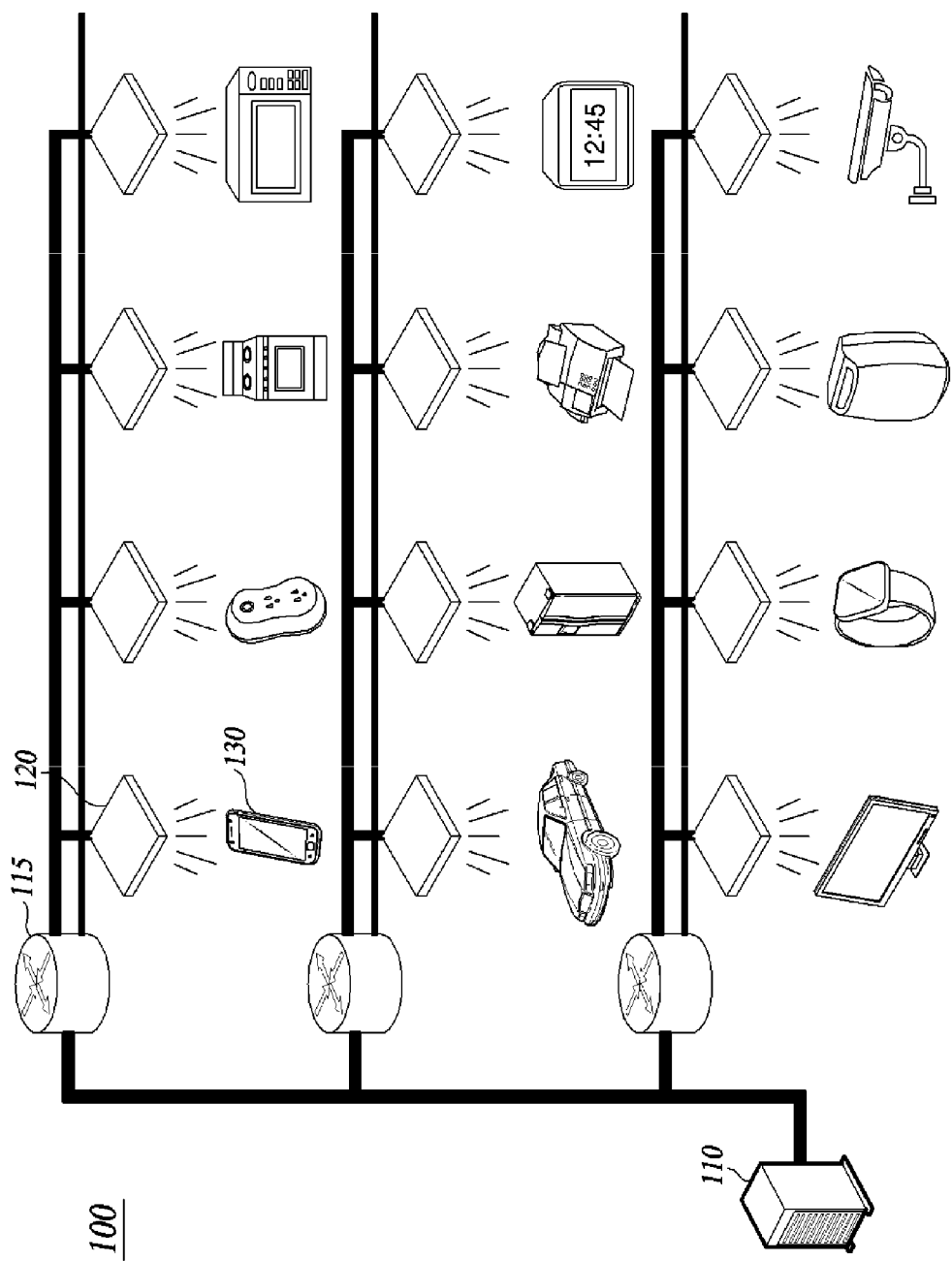
FIG. 1 is a diagram illustrating a visible light communication Internet of Things (IoT) system according to an embodiment of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted when it may make the subject matter of the present disclosure rather unclear.

Additionally, various terms such as first, second, A, B, (a), (b), etc., are used solely for the purpose of differentiating one component from the other but neither imply nor suggest the substances, the order or sequence of the components. Throughout this specification, when a part "includes" or "comprises" a component, the part may further include other components, and such other components are not excluded unless there is a particular description contrary thereto. Terms such as "unit," "module," and the like refer to units for processing at least one function or operation, which may be implemented by hardware, software, or a combination thereof.

FIG. 1 is a diagram illustrating a visible light communication (VLC) Internet of Things (IoT) system according to an embodiment of the present disclosure.

Referring to FIG. 1, a VLC IoT system 100 according to an embodiment of the present disclosure includes a server 110, an aggregator 115, a lighting device 120, and a terminal 130.

The server 110 is a management device of the VLC IoT system that manages pre-registered lighting devices or terminals and transmits appropriate data to the terminal 130.

The server 110 is connected to the lighting device 120 over a wired or wireless network for a control operation. The wired network includes wired communication using Ethernet communication, a universal serial bus (USB), a wire, a twisted pair of wires, a coaxial cable, an optical link, and the like. The wireless network may include Bluetooth, Radio Frequency Identification (RFID), Infrared Data Association (UDA), Ultra-Wide Band (UWB), ZigBee, Digital Living Network Alliance (DLNA), Wireless LAN (WLAN), Wi-Fi, Wireless Broadband (WiBro), World Interoperability for Microwave Access (WIMAX), High Speed Downlink Packet Access (HSDPA), and Long Term Evolution (LTE)/LTE-Advanced (LTE-A).

The server 110 is connected to the lighting device 120 via the aggregator 115 to transmit data to the lighting device 120 or control the lighting device 120 to transmit the data to the specific terminal 130. The server 110 stores a lighting device identifier, such as an IP address of the lighting device 120, in order to transmit data to the lighting device 120. The server 110 also stores identifiers of one or more terminals which are capable of receiving information from the lighting device using visible light communication. The server 110 generates data to be transmitted to the specific terminal among the stored terminals or data to be transmitted to a specific lighting device among the stored lighting devices. The server 110 controls the lighting device 120 to transmit the generated data to the specific lighting device or the specific terminal. Details will be described with reference to FIGS. 2 and 3.

The server 110 stores service identifiers together with the identifiers of the terminals. The server 110 stores information about a service that each terminal intends to use together with the identifier of the corresponding terminal. Accordingly, the server 110 may recognize a VLC service for which each terminal has been registered with the server 110.

The aggregator 115 is a device connected to one or more lighting devices to transmit data received from the server 110 to a lighting device or to collect data transmitted by the one or more lighting devices and deliver the collected data at once or sequentially. The aggregator 115 may be implemented as a separate element between the server 110 and the lighting device 120, or may be implemented as a module in the server 110 to perform the above-described operation in the server 110.

The lighting device 120 is a device which transmits the data received from the server 110 to a terminal using visible light communication. The lighting device 120 generates a visible light signal representing data to be transmitted to the terminal by repeatedly turning on/off, and transmits the visible light signal to the terminal. Since the lighting device 120 repeatedly turns on/off at a speed unnoticeable by the human optic nerve system, the lighting device may maintain the function of lighting while transmitting data. The lighting device 120 may be implemented as a light emitting diode (LED), but is not limited thereto. The lighting device may be replaced with any device that emits visible light, such as a fluorescent lamp or visible light laser.

The lighting device 120 has a wired or wireless communication module to enable wired/wireless network communication. The lighting device 120 includes a wired communication module when the lighting device is configured to transmit and receive data to and from the server 110 using wired network communication, and includes a wireless communication module when the lighting device is configured to use wireless network communication. The lighting device 120 may use the wireless communication module when there is a need to receive information from the terminal 130. The lighting device 120 may include both a wired communication module and a wireless communication module, or include a wireless communication module alone.

The lighting device 120 delivers data to a terminal using light in the range of visible light wavelengths. The lighting device 120 is connected to the server 110 over a wired/wireless network as described above, and receives data having a form transmittable from the server 110 over the wired/wireless network. The lighting device 120 analyzes the received data, checks the identifier of the terminal and the service identifier included in the data, and generates data having a form transmittable through visible light communication. The lighting device 120 includes the identifier of the terminal and the service identifier in the data having a form transmittable through visible light communication, such that the specific terminal 130 check the identifiers.

The terminal 130 is a device that extracts data from the visible light signal received from the lighting device 120. The terminal 130 receives the visible light signal from the lighting device 120 using a visible light reception module. The visible light reception module may be implemented as a camera, a photodiode, or the like, but is not limited thereto. Any module capable of receiving visible light may be employed in place of the visible light reception module. The terminal 130 may employ the visible light reception module as a built-in module or an external module. The terminal 130 receives data over a visible light signal emitted from the lighting device 120. Upon receiving the data, the terminal 130 analyzes the received data and checks whether the data is intended for the terminal 130. When the received data is intended for the terminal, the terminal 130 checks the information contained in the data. On the other hand, when the received data is not intended for the terminal, the terminal 130 filters out the data.

The terminal 130 may be implemented as a smart device such as a smartphone or a tablet, a notebook computer, a laptop, or a personal digital assistant (PDA), but is not limited thereto. The terminal 130 may be implemented as an IoT device that is equipped with a sensor including a light receiving sensor and a communication function and disposed in a variety of objects such as a household appliance, a power outlet, an automobile, and the like, and is capable of connecting to the Internet.

Here, the identifier of the lighting device 120 or the identifier of the terminal 130 refers to information for identifying each lighting device or terminal. As the identifier, a unique production number assigned at the time of production of the lighting device or the terminal may be used, or unique identification information such as, for example, an IP address or a MAC address on the network used by the lighting device or the terminal may be used. The above-mentioned types of information are merely an example of the identifier, and the identifier includes any information by which each lighting device or terminal can be identified.

Figure 2:
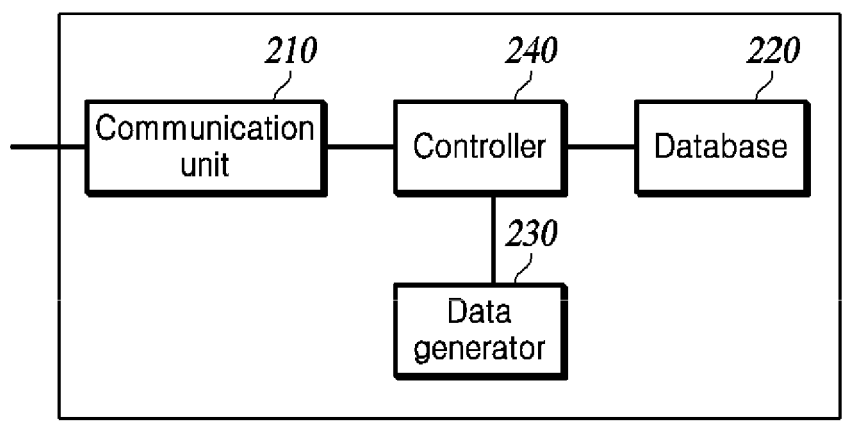
FIG. 2 is a configuration diagram of a server according to an embodiment of the present disclosure.

FIG. 2 is a configuration diagram of a server according to an embodiment of the present disclosure.

Referring to FIG. 2, a server 110 according to an embodiment of the present disclosure includes a communication unit 210, a database 220, a data generator 230, and a controller 240.

The communication unit 210 transmits data to the lighting device 120 under control of the controller 240. The communication unit 210 may be implemented as a wired communication module or a wireless communication module depending on the type of connection with the lighting device 120. The communication unit 210 transmits data generated by the data generator 230 to the lighting device 120 by wire or wirelessly according to the implemented form thereof.

The database 220 stores the identifiers of a lighting device and the identifier of a terminal, and distinguishes each lighting device and each terminal using the stored identifier of the lighting device or the terminal. In order to receive specific information or a specific service through visible light communication, the lighting device and the terminal are pre-registered with the server 110. The lighting device and the terminal are registered by transmitting the identifiers thereof to the server 110, and the server 110 stores the received identifiers of the lighting device and the terminal in the database 220. The database 220 stores the identifier of the terminal by matching the identifier of the terminal with the identifier of the lighting device. Since a specific terminal is positioned near a specific lighting device and thus can receive data only from the specific lighting device, the database 220 may store the identifier of the terminal by matching the identifier of the terminal with the identifier of the lighting device. When the server 110 receives the identifier of the terminal together with the identifier of the lighting device from the lighting device, the database 220 stores the received identifiers of the terminal and the lighting device together. When the server 110 receives the identifier of the terminal directly from the terminal rather than from the lighting device, the server 110 identifies the location information about each of the terminal and the lighting device. The controller 240 of the server 110 may receive the location information directly from the terminal or identify the location of the terminal using the properties (for example, the signal strength or the direction in which the signal is received) of a signal transmitted and received by the terminal and the server. The location information about the lighting device may also be identified in a similar manner. Using the identified location information about each of the terminal and the lighting device, the database 220 may store the identifier of a specific terminal by matching the identifier of the specific terminal with the identifier of a lighting device located closest to the specific terminal.

The database 220 may store a service identifier together with the identifier of the terminal. The service identifier refers to information for distinguishing each VLC service which the server 110 provides using the lighting device 120. The terminals stored in the server 110 may be registered to use different services. For example, terminal A may be registered to use the positioning service among the VLC services, and terminal B may be registered to use an information transport service among the VLC services. The terminal may transmit, to the server 110, the information about a VLC service to be used together with the identifier thereof. The server 110 may assign a service identifier to the service information and store the service identifier together with the identifier of the terminal in the database 220.

The data generator 230 generates data of a physical layer which is to be transmitted to the lighting device 120. Details will be described with reference to FIGS. 3 and 4.

Figure 3:
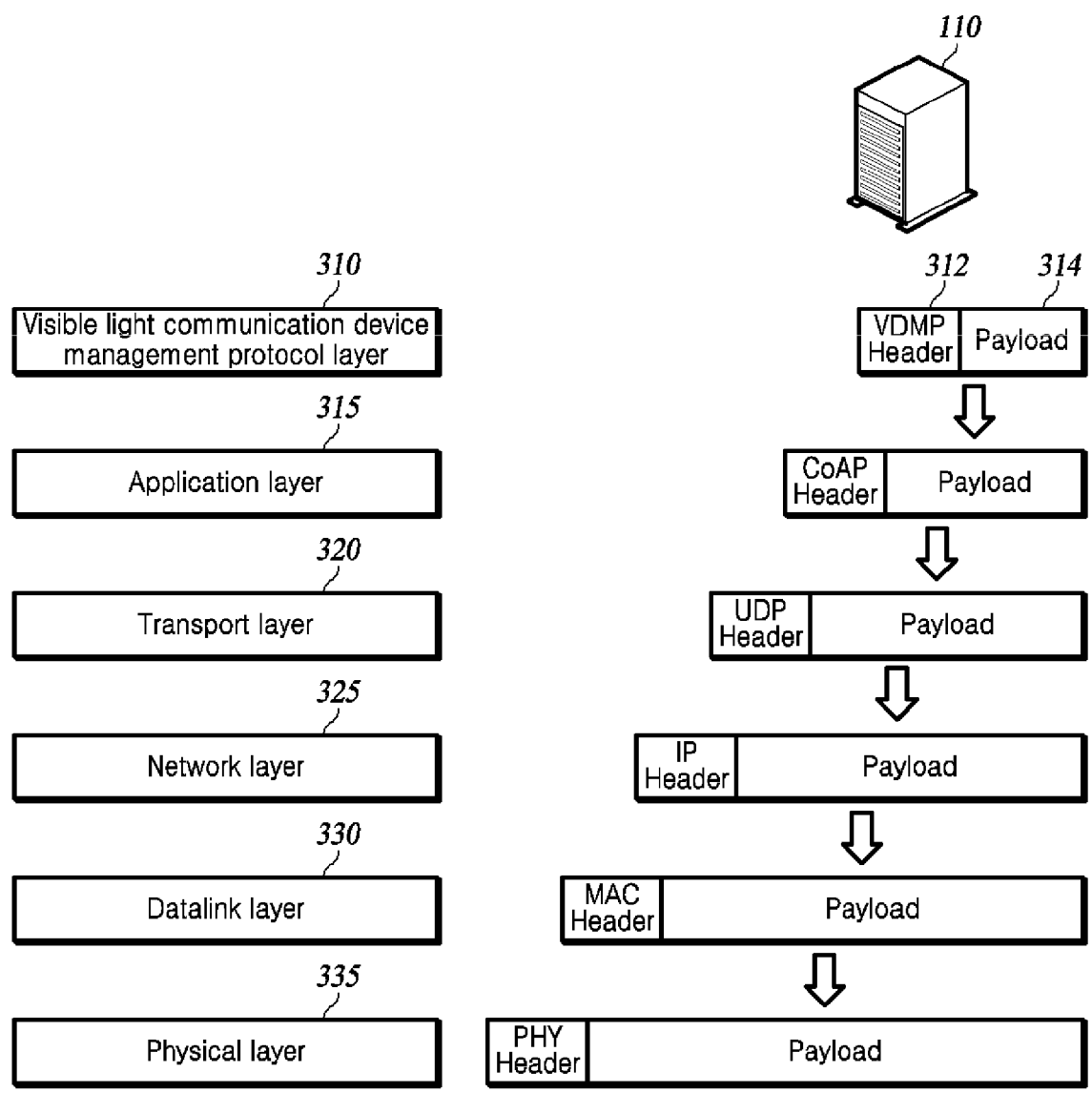
FIG. 3 is a diagram illustrating a method of generating data by a server according to an embodiment of the present disclosure.

FIG. 3 is a diagram illustrating a method of generating data by a server according to an embodiment of the present disclosure.

Data is divided into various communication layers. The basic communication layers include an application layer 315, a transport layer 320, a network layer 325, a datalink layer 330, and a physical layer, which correspond to an Open Systems Interconnection Reference Model (OSI model).

The application layer 315, which is the highest layer in the OSI model, serves to provide a user with an access to network resources. The application layer 315, which is the only layer visible to the user among the seven layers of the OSI, provides all the basic interfaces for network activities. Various protocols are used in the application layer 315, including Constrained Application Protocol (CoAP), Message Queue Telemetry Transport (MQTT), File Transfer Protocol (FTP), Hypertext Transfer Protocol (HTTP), and Simple Mail Transfer Protocol (SMTP). The server 110 may transmit and receive data to and from the lighting device 120 and the lighting device 120 may transmit and receive data to and from the terminal 130 through wireless communication. Accordingly, CoAP and MQTT may be mainly used in the application layer 315 for the following reasons.

With development of IoT technology, various objects can be used as IoT devices. Since IoT devices are regarded as IoT nodes in the IoT environment, the IoT devices must be capable of connecting to the network. The Internet has traditionally been connected to resource-rich devices with large power, large memory and many connection options, and thus had no problem. However, IoT devices consume very low power, have limited resources, and should ensure long-term use. Therefore, there has been a need for a lightweight messaging protocol to be applied to such IoT devices. CoAP or MQTT is a protocol introduced to meet such a need.

The CoAP protocol is a lightweight messaging protocol that is specialized for use in constrained environments with a high probability of data loss, such as Machine to Machine (M2M) communication and Internet of Things (IoT). CoAP basically operates as a UDP-based one-to-one (1:1) "Request/Response" interactive model and supports multicast.

Similarly, MQTT is a Push Technology-based lightweight message transfer protocol that is specialized for use in network environments causing delays and severe loss, such as M2M and IoT. MQTT operates as a TCP-based "Publish/Subscribe" model. MQTT is a scheme in which a sender publishes a specific message and a receiver subscribes to the message using a message broker, in contrast with the client/server scheme that is commonly used in the push technology. That is, in MQTT, messages are transmitted and received via a broker. Because MQTT uses a broker, MQTT allows many-to-many communication for transferring messages between multiple clients.

Because the lighting device 120 consumes low power and has a limited memory, it may be appropriate for the server 110 to use CoAP or MQTT in transmitting and receiving data to and from the lighting device 120. In addition, when the terminal 130, which may be implemented in various forms, is implemented as an IoT device, the terminal 130 also consumes low power and has a limited memory, and thus needs to use a lightweight messaging protocol. Currently, when short-range wireless communication is used for the IoT device to perform wireless communication with another device (the lighting device in the present disclosure), only the datalink layer and the lower layer are used. However, with the development of networking technology, there is an attempt to utilize layers higher than the datalink layer in short-range wireless communication. Accordingly, when the lighting device and an IoT device, which is an example of the terminal, transmit and receive data by wireless communication, CoAP or MQTT may be used for both the lighting device and the IoT device. However, the above description is not limited to use of CoAP or MQTT as an application protocol, and various protocols may be used as an application protocol depending on situation and constraints.

The transport layer 320, which is a lower layer of the application layer 315, serves as a flow control of checking whether data is lost, changed, or missing when the data is transmitted or received. The transport layer 320 manages the message control and error between the source and the destination (end-to-end), checks whether transmission of the packets is valid, and sends a transmission-failed packet again to ensure reliable communication. Various protocols such as Transmission Control Protocol (TCP), User Datagram Protocol (UDP), Datagram Congestion Control Protocol (DCCP), and Stream Control Transmission Protocol (SCTP) are used in the transport layer 320. When CoAP or MQTT is used in the application layer 315, the transport layer 320 uses TCP or UDP due to the characteristics thereof.

The network layer 325, which is a lower layer of the transport layer 320, serves as a router for determining a transfer path of data between physical networks. The network layer 325 assigns and manages a logical address of the network host, and finds a path during transfer via multiple nodes. In addition, the network layer 325 provides various functional and procedural means for delivering data of various lengths over the network and providing Quality of Service (QoS) in the process. The protocols used in the network layer 325 include Internet Protocol (IP), Internet Control Message Protocol (ICMP), Internet Group Management Protocol (IGMP), Dynamic Host Configuration Protocol (DHCP), and Address Resolution Protocol (ARP). When TCP or UDP is used in the transport layer 320, IP is used for the network layer 325 due to the characteristics thereof.

The datalink layer 330, which is a lower layer of the network layer 325, serves to find and correct errors of electrical signals sent from the physical layer using parity check (1 byte error check), block sum check, cyclic redundancy check, and the like to ensure reliable transport between terminals. The datalink layer 330 assigns addresses to the frames and performs error detection, data transmission, flow control, and the like. The protocols used in the datalink layer 330 include Media Access Control (MAC), Fiber Distributed Digital Interface (FDDI), and Point-to-Point Protocol (PPP). When IP is used in the network layer 325, MAC is used for the datalink layer 330 due to the characteristics thereof.

The physical layer 335, which is the lowest layer, serves to convert data into an electrical signal and transmit the electrical signal. The physical layer 335, is a physical medium that is used when network data is transmitted, defines the physical and electronic characteristics of the entire hardware, including voltages, hub network adapters, repeaters, and cables. In addition, the physical layer 335 defines the electrical, mechanical, functional, and procedural attributes of the transfer medium for transmitting non-standardized bits.

A VLC Device Management Protocol (VDMP) layer 310 serves to control and manage the settings, environment, or operation of the VLC device, i.e., the terminal, which is to receive the data of the physical layer 335. The VDMP layer 310 corresponds to a higher layer of the application layer 315, which is the highest layer in the OSI model.

The data generator 230 generates data of the physical layer including the data of the VDMP layer 310. The data of the VDMP layer 310 is shown in FIG. 4.

Figure 4:
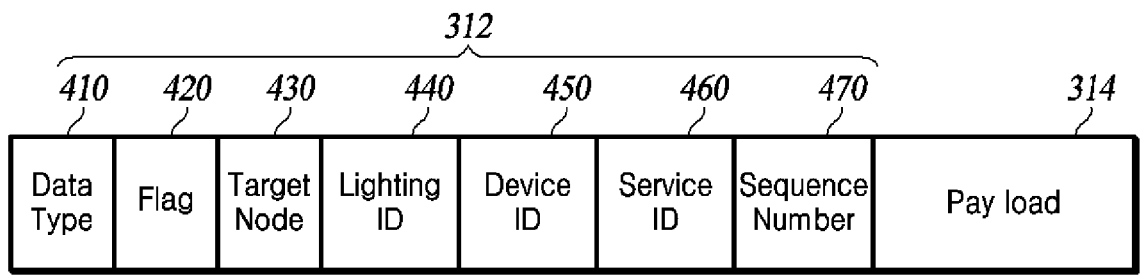
FIG. 4 is a diagram illustrating a configuration of data of a VDMP layer according to an embodiment of the present disclosure.

FIG. 4 is a diagram illustrating a configuration of data of a VDMP layer according to an embodiment of the present disclosure.

The data of the VDMP layer 310 is composed of a header 312 and a payload 314.

The VDMP header 312 includes a data type field 410, a flag field 420, a target node field 430, a lighting ID field 440, a device ID field 450, a service ID field 460, and a sequence number 470.

The data type field 410 is a field for checking the type of data to be transmitted. The data type field 410 is used to determine whether the type of data to be transmitted by the server is control data for controlling a target node of the data or information data for transferring information to the target node of the data. For example, when the value of the data type field 410 is 0, the data type may be control data. When the value of the data type field 410 is 1, the data type may be information data.

The flag field 420 is a field for checking what kind of control is performed when the type of data to be transmitted is control data. There are various kinds of control, such as allowing the target node to perform a specific operation, changing the setting of the target node, or causing the target to responding to the server regarding whether the target node is in a state where it can continuously communicate with the server. The flag field 420 allows the user to check the kinds of these various controls. For example, when the value of the flag field 420 is 0, it may indicate a kind of control that changes the setting of the lighting device 120 or the terminal 130. When the value of the flag field 420 is 1, it may indicate a kind of control that causes the lighting device 120 or the terminal 130 to perform a specific operation.

The target node field 430 is a field that allows the server to check the node which is the final destination position of the data to be transmitted. The target node field 430 is used to determine whether the data to be transmitted by the server is data for the lighting device or data for the terminal 130. For example, when the value of the target node field 430 is 0, the data may be data to be transmitted to a lighting device. When the value of the target node field 430 is 1, the data may be data to be transmitted to a terminal.

The lighting ID field 440 is a field for identifying a lighting device to which the data is to be transmitted. When the data to be transmitted by the server is data for a lighting device, the lighting ID field 440 contains the identifier of the lighting device corresponding to the destination of the data. On the other hand, when the data to be transmitted by the server is data for the terminal, the lighting ID field 440 contains the identifier of a lighting device via which the data is to be transmitted to the terminal.

The device ID field 450 is a field for identifying a terminal to receive the data. When the data to be transmitted by the server is data for a lighting device, the device ID field 450 does not have a value. When the data to be transmitted by the server is data for a terminal, the device ID field 450 includes an identifier of the terminal to receive the data.

The service ID field 460 is a field for identifying a service to be used by a terminal to receive the data. If the data to be transmitted by the server is data for the terminal, the service ID field 460 includes a stored service identifier along with the identifier of the terminal.

The sequence number field 470 is a field that allows the server to identify each of the data to be transmitted. Typically, the server 110 transmits and receives a lot of data to and from a specific terminal. Accordingly, the server 110 needs to distinguish which of the response data received from the terminal is response data corresponding to specific data transmitted to the terminal. The sequence number field 470 is a field for identifying the sequence number. If the sequence number of the data transmitted by the server to the terminal matches the sequence number of the response data transmitted to the server by the terminal, it may be determined that the response data is a response to specific data transmitted to the terminal by the server. On the other hand, when the sequence numbers do not match, it may be determined that both data are irrelevant to each other.

The data generator 230 includes information to be transmitted to a terminal or a lighting device in the payload 314 of the VDMP layer. For example, when the data to be transmitted is control data, the data generator 230 includes information for controlling a target node (the terminal or the lighting device) in the payload 314 of the VDMP layer. Alternatively, when the data to be transmitted is information data, the data generator 230 includes information to be transmitted to the target node (the terminal or the lighting device) or information about a specific service in the payload 314 of the VDMP layer.

The data generator 230 generates a payload of the application layer 315 including data of the VDMP layer 310 and data of the application layer 315 including a header of a protocol used by the server 110 in the application layer 315.

The data generator 230 generates data of each layer in the same manner. The data of the physical layer 335 which is the lowest layer finally includes the data of the datalink layer in the payload and includes the header of the protocol used by the server 110 in the physical layer 335. Therefore, the data of the physical layer generated by the data generator 230 includes the headers of all the higher layers including the VDMP layer and the information to be transmitted to the terminal 130.

While FIG. 3 illustrates that the data generator 230 generates data having a communication layer of the OSI model, embodiments are not limited to generating only the data having the communication layer of the OSI model. Data having communication layers of various models including the TCP/IP model other than the OSI model may be generated. The data generator 230 may include data of the VDMP layer in the payload of the highest layer defined by the specific model, and the data may have a communication layer of any model.

The controller 240 determines information to be transmitted to each terminal or lighting device registered in the database 220. When data is transmitted to the terminal, the controller 240 determines information to be transmitted to each terminal by checking the stored service identifiers corresponding to the identifiers of the terminals registered in the database 220. The controller 240 determines information to be transmitted to a specific terminal or lighting device registered in the database 220 and controls the data generator 230 to generate data of the VDMP layer.

The controller 240 performs a control operation to transmit the data generated by the data generator 230 to the lighting device 120. The controller 240 controls the communication unit 210 to check the identifier of the lighting device stored in the database 220 in association with the identifier of the terminal and controls the communication unit 210 to transmit the generated data to the lighting device 120.

Figure 5:
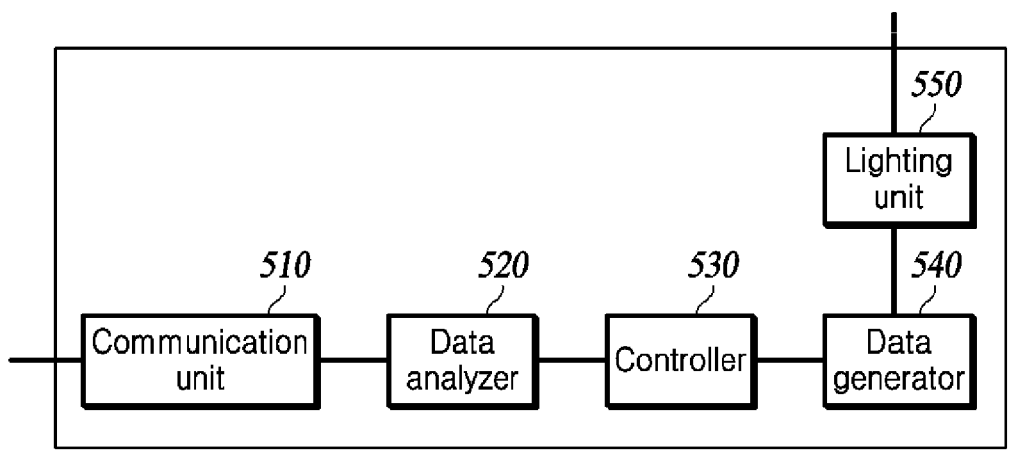
FIG. 5 is a configuration diagram of a lighting device according to an embodiment of the present disclosure.

FIG. 5 is a configuration diagram of a lighting device according to an embodiment of the present disclosure.

Referring to FIG. 5, the lighting device 120 according to an embodiment of the present disclosure includes a communication unit 510, a data analyzer 520, a controller 530, a data generator 540, and a lighting unit 550.

The communication unit 510 receives data of the physical layer 335 from the server 110. The communication unit 510 may be connected to the server 110 using a wired/wireless communication module and receive the data of the physical layer 335 from the server 110.

The data analyzer 520 analyzes the data of the physical layer 335 and distinguishes among the data of the respective layers. Details will be described with reference to FIG. 6(a).

FIG. 6(a) is a diagram illustrating a method of analyzing data by a lighting device according to an embodiment of the present disclosure.

The data analyzer 520 analyzes the data of the physical layer received by the communication unit 510 and divides the data into a header and a payload of the physical layer. Thereafter, the data analyzer 520 divides the payload of the physical layer into a header and a payload of a higher layer (datalink layer). In this way, the data analyzer 520 analyzes the data of a specific layer, divides the data into a header and a payload, analyzes the payload, and divides the payload into a header and a payload of a higher layer. The data analyzer 520 divides the data of the physical layer 335 into a header and data of each higher layer with respect to the physical layer and finally divides the data into the VDMP header 312 and the VDMP payload 314. The data analyzer 520 divides the data of the physical layer 335 and then analyzes each field in the VDMP header 312 to identify the information contained in the header.

The controller 530 checks the analysis result of the data analyzer 520 and determines whether the received data of the physical layer is data to be transmitted to the lighting device 120 or data to be transmitted to the terminal 130. By checking the target node field 430 in the VDMP header 312, the controller 530 determines whether to transmit the data to the terminal 130. If the received data of the physical layer data is data to be transmitted to the terminal 130, the controller 530 transmits the analysis result of the data analyzer 520 to the data generator 540 to control the data generator 540 540 to generate data to be transmitted to the terminal.

The data generator 540 generates data which the lighting unit 550 can transmit to the terminal using visible light communication under control of the controller 530. Details will be described with reference to FIGS. 6(*b*) and 7.

Figure 6:
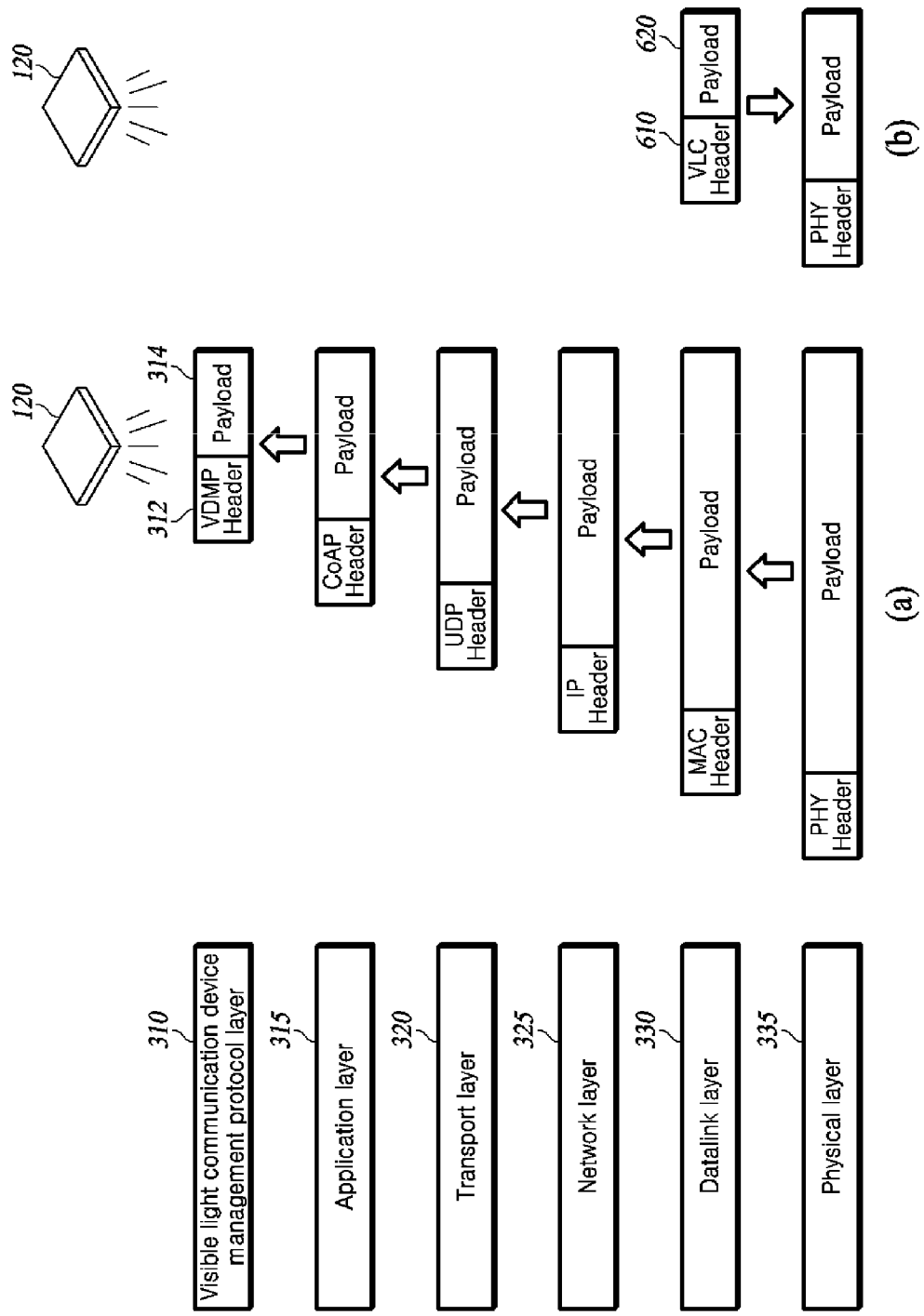
FIG. 6 is a diagram illustrating a method of analyzing and regenerating data by a lighting device according to an embodiment of the present disclosure.
Figure 7:
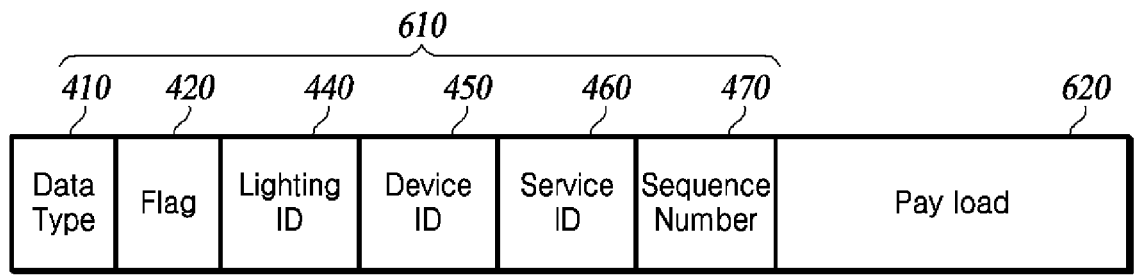
FIG. 7 is a diagram illustrating a configuration of visible light communication data according to an embodiment of the present disclosure.

FIG. 6(*b*) is a diagram illustrating a method of generating data by a lighting device according to an embodiment of the present disclosure, and FIG. 7 is a diagram illustrating a configuration of visible light communication data according to an embodiment of the present disclosure.

Visible light communication data is divided into a header 610 and a payload 620.

The data generator 540 generates data of the datalink layer 330 including the information obtained by the controller 530. In generating the data of the datalink layer 330, the data generator 540 generates a protocol that enables visible light communication (VLC). That is, the data generator 540 regenerates the data received by the communication unit 510 from the server 110 using the wired or wireless communication such that the lighting unit 550 can transmit the data using VLC.

The data generator 540 generates data of the datalink layer 330 including only necessary fields of the VDMP header 312 in the header.

The data generator 540 includes the data type field 410 of the VDMP header 312 in the data header of the datalink layer 330. The data generator 540 includes the data type field 410 of the VDMP header 312 such that the terminal receiving the data can check whether the data is control data or information data.

The data generator 540 includes the flag field 420 of the VDMP header 312 in the data header of the datalink layer 330. Based on the flag field 420, the terminal 130 may check the kind of the control data transmitted to the terminal 130.

The data generator 540 includes the lighting ID field 440 of the VDMP header 312 in the data header of the datalink layer 330. When the terminal 130 receives data from the lighting device 120, the source that transmitted the data is identified from the lighting ID field 440. In addition, when terminal 130 transmits response data for the received data, the lighting device ID may be used for a destination to receive the response data.

The data generator 540 includes the device ID field 450 of the VDMP header 312 in the data header of the datalink layer 330. From the device ID field 450, the terminal 130 receiving the data from the lighting device 120 may identify whether the data is intended for the terminal 130.

The data generator 540 includes the service ID field 460 of the VDMP header 312 in the data header of the datalink layer 330. Based on the service ID field 460, the terminal 130 receiving the data may identify a service for which the data is transmitted.

The data generator 540 includes the sequence number field 470 of the VDMP header 312 in the data header of the datalink layer 330. Using the sequence number field 470, the terminal 130 identifies the received data and the data for which response data is provided later.

The data generator 540 generates a payload 620 of the datalink layer 330 including information to be transmitted to the terminal 130 as analyzed by the data analyzer 520. The data generator 540 generates data of the datalink layer 330 including the generated header 610 and the payload 620.

The data generator 540 generates data of the physical layer 335 including the generated data of the datalink layer.

The lighting unit 550 modulates the data of the physical layer generated by the data generator 540 into a visible light signal and transmits the modulated light signal to the terminal 130. Other terminals as well as the terminal 130 within the coverage of the visible light signal of the lighting unit 550 may receive data of the physical layer.

Figure 8:
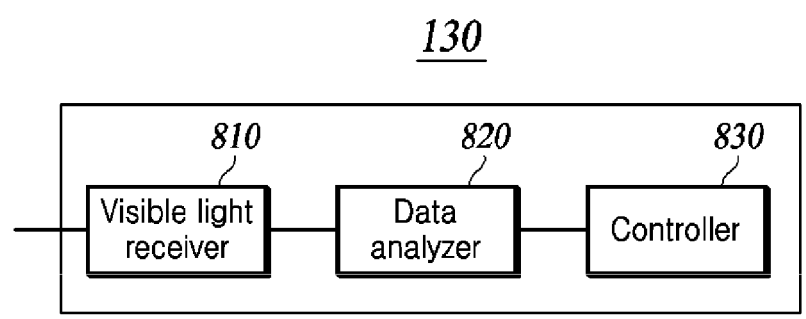
FIG. 8 is a configuration diagram of a terminal according to an embodiment of the present disclosure.

FIG. 8 is a configuration diagram of a terminal according to an embodiment of the present disclosure.

Referring to FIG. 8, a terminal 130 according to an embodiment of the present disclosure includes a visible light receiver 810, a data analyzer 820, and a controller 830.

The visible light receiver 810 receives data from the lighting device 120. The visible light receiver 810 may be implemented as a built-in or external camera or a visible light reception module in the terminal 130, and may receive data transmitted over a visible light signal.

The data analyzer 820 analyzes the data of the physical layer 335 received by the visible light receiver 810 and distinguishes data of each layer. Details will be described with reference to FIG. 9.

Figure 9:
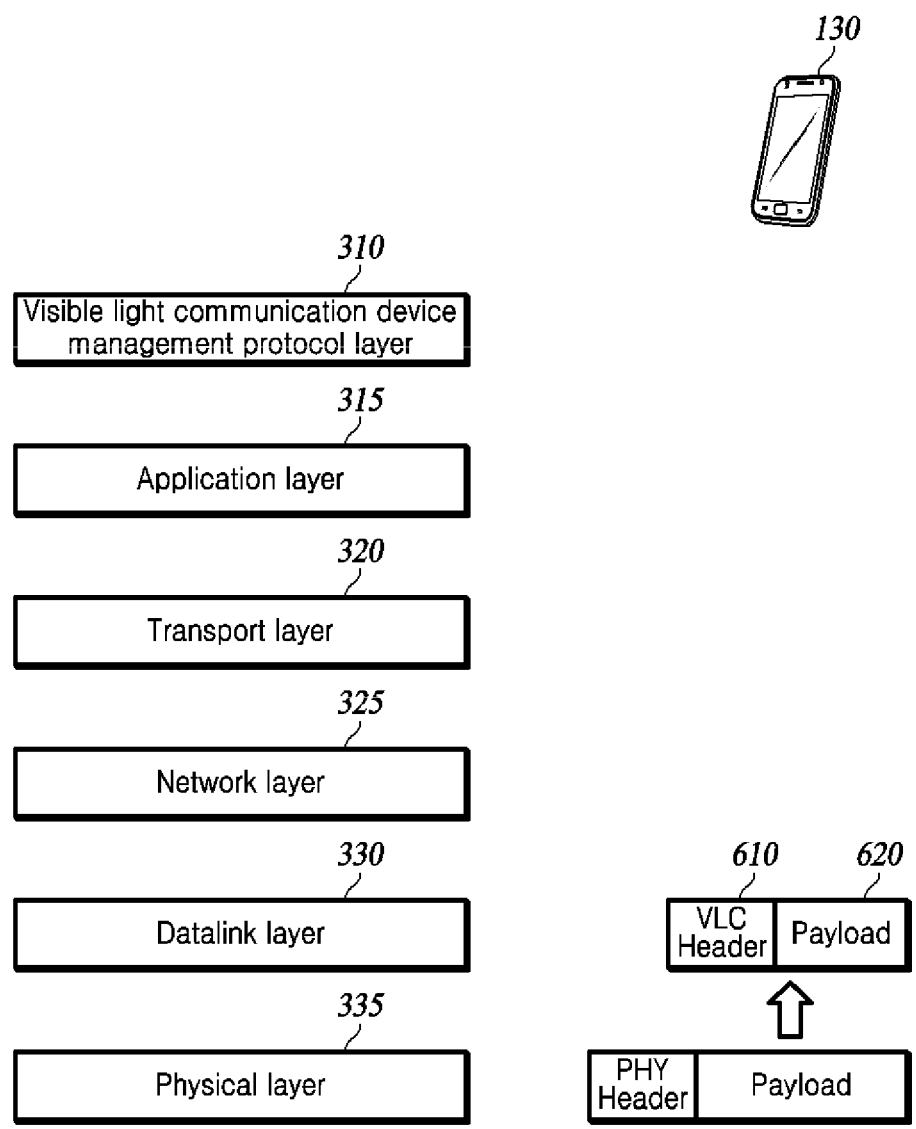
FIG. 9 is a diagram illustrating a method of analyzing data by a terminal according to an embodiment of the present disclosure.

FIG. 9 is a diagram illustrating a method of analyzing data by a terminal according to an embodiment of the present disclosure.

The data analyzer 820 analyzes data of the physical layer 335 received by the visible light receiver 810 and divides the data into a header and a payload of the physical layer. Thereafter, the data analyzer 820 distinguishes the payload and the header of the datalink layer included in the payload of the physical layer.

The control unit 830 determines whether the transmitted data is for the terminal 130 based on the information identified by the data analyzer 820. The controller 830 checks the header of the datalink layer and identifies the identifier of the terminal included in the datalink layer or the identifier of the service that the terminal intends to use. After identifying the identifier of the terminal or the service identifier, the control unit 830 compares the identifier of the terminal or the service identifier with the identifier of the terminal 130 or the service identifier. As a result of the comparison, when the identified identifier of the terminal (and the service identifier if the service identifier exists) matches the identifier of the terminal 130 (and the service identifier if the service identifier exists), the controller 830 determines that the transmitted data is intended therefor, and checks the information included in the payload of the datalink layer. On the other hand, when the identified identifier of the terminal does not match the identifier of the terminal 130, the controller 830 determines that the transmitted data is not intended for the terminal 130 and filters out the data.

Figure 10:
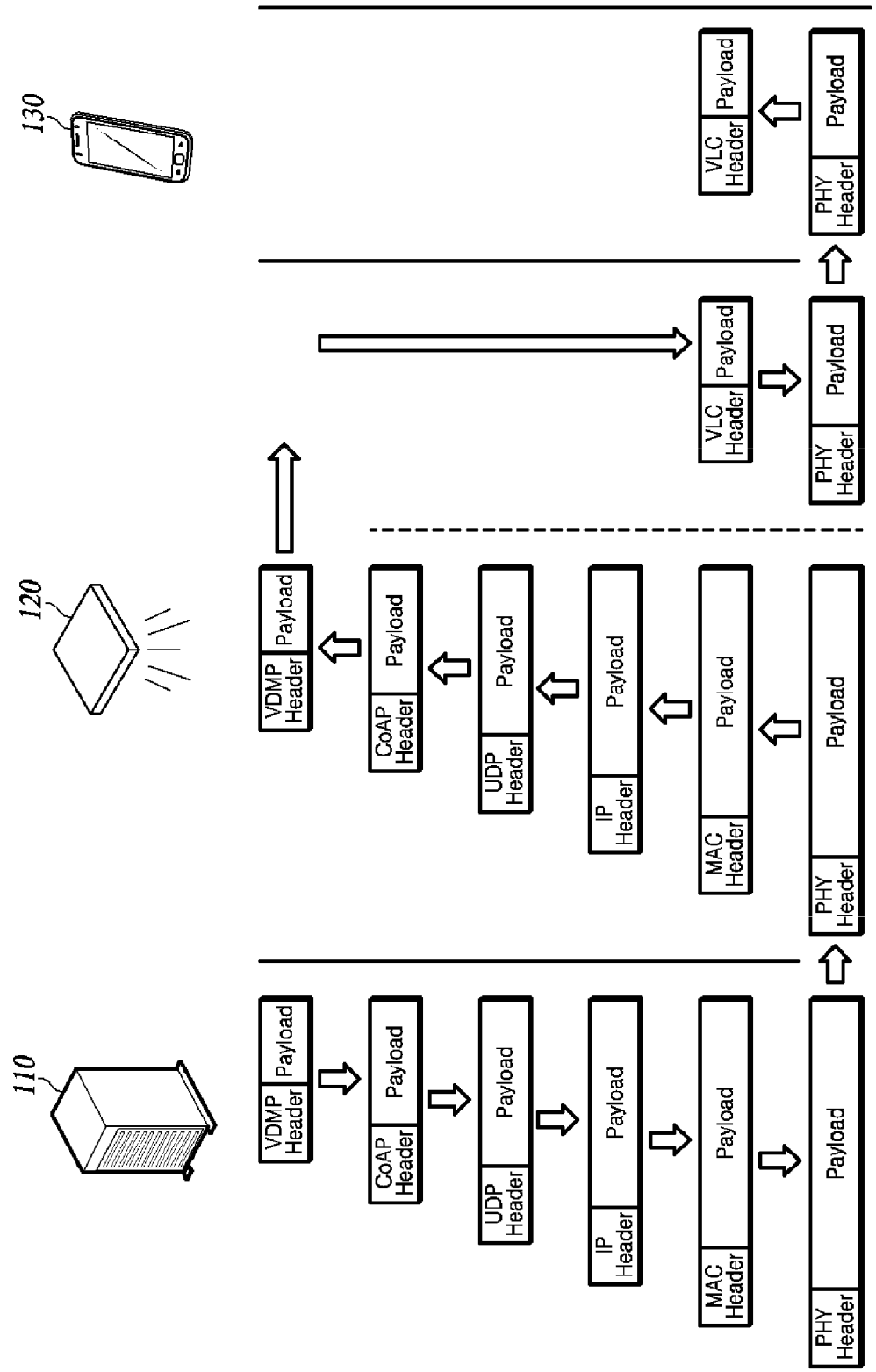
FIG. 10 is a diagram illustrating a method of generating and analyzing data in a visible light communication IoT system according to an embodiment of the present disclosure.

FIG. 10 is a diagram illustrating a method of generating and analyzing data in a visible light communication IoT system according to an embodiment of the present disclosure.

The server 110 generates data of the VDMP layer including the identifier of the terminal 130 to which the server 110 is to transmit data and information destined for the terminal 130, and includes the generated VDMP layer data in the payload of the application layer, which is a lower layer. The server 110 generates a header of the application layer to generate data of the application layer. In the same manner, the server 110 generates data of the physical layer including the data of the VDMP layer and the header of a higher layer. The server 110 transmits the generated data of the physical layer to the lighting device 120.

The lighting device 120 analyzes the data of the physical layer received from the server 110. The lighting device 120 analyzes the received data of the physical layer and divides the data into a header and a payload of the physical layer. Then, the lighting device 120 distinguishes the payload and the header of a higher layer (datalink layer) included in the payload of the physical layer. In this manner, the lighting device 120 divides the VDMP header and the VDMP payload into the information included in the VDMP header and the information to be transmitted to the terminal 130. The lighting device 120 generates data of the datalink layer having a protocol that allows identification and information to be transmitted to the terminal through visible light communication. The lighting device 120 generates data of the physical layer including the data of the datalink layer in the payload and transmits the data to the terminal using visible light communication.

The terminal 130 receives data of the physical layer transmitted from the lighting device 120 using visible light communication. The terminal 130 analyzes the header of the received data and determines whether the transmitted data is for the terminal 130. When the transmitted data is intended for the terminal 130, the terminal 130 checks the information included in the payload of the received data. When the transmitted data is not intended for the terminal 130, the terminal 130 filters out the data. In this way, the server 110 may transmit data to the specific terminal 130 through one-to-one visible light communication.

An example of the visible light communication IoT system shown in FIG. 1 or 10 will be described below. For example, assuming that the visible light communication IoT system to be used is a home appliance IoT service, the server 110 is a management device that receives data from the IoT service user in the house and controls the operation of the lighting device or the IoT device by transmitting the data to the lighting device or the IoT device. The server 110 distinguishes whether the data received from the user of the IoT service is control data or information data, and whether the transmitted data is intended for the lighting device or the IoT device. The server 110 includes the divided content in the header, and generates data including the content of the data, for example, control content for control data and content of the information for information data, in the payload, and transmits the data to the lighting device. The lighting device 120 may be implemented as a variety of lights, such as fluorescent lamps and LEDs for use at home. The lighting device 120 receives and analyzes the above-described data from the server. By analyzing the data, the lighting device 120 determines whether the transmitted data is intended therefor or for the IoT device, and distinguishes whether the data is control data for instructing an operation or information data for delivering information. For example, when the data transmitted from the server is data for turning off the lighting device, the lighting device 120 determines that the transmitted data is intended for the lighting device 120 and operates according to the corresponding control by determining that the data is control data instructing the off operation. On the other hand, when the data transmitted from the server is data for instructing the IoT device to perform a specific operation, the lighting device 120 determines that the transmitted data is intended for the lighting device. In the case where the transmitted data is intended for the IoT device, the lighting device 120 regenerates data to be transmitted through visible light communication based on the data received from the server. The regenerated data includes an indication of whether the data type is control data or information data, and an identifier of the IoT device for identifying an IoT device to receive the data. The lighting device 120 transmits the regenerated data to the IoT device through visible light communication. The IoT device 130 (referring to the terminal of the present disclosure) may be implemented as various domestic appliances, such as an air conditioner, a monitor, and a TV. The IoT device 130 receives data from the lighting device 120 using visible light communication, and analyzes the received data. By analyzing the data, the IoT device 130 checks the terminal identifier included in the data, and determines whether the transmitted data is intended therefor and the type of the data. The IoT device 130 operates according to the type included in the data when the transmitted data is intended for the IoT device 130. For example, when the IoT device 130 is an air conditioner and data for instructing the air conditioner to lower the desired indoor temperature is received, the air conditioner may determine that the data is control data instructing that the desired indoor temperature should be lowered, and perform an operation of lowering the desired temperature. In the case where the IoT device 130 is a monitor or a TV, when data about specific information to be output by a monitor or a TV is received, the monitor or the TV may determine that the data is information data, and perform an operation of outputting the information.

Another example of the visible light communication IoT system shown in FIG. 1 or 10 will be described below. For example, when the visible light communication IoT system is used for a positioning service of an IoT device such as a missing child-finding service or a position verification service for various IoT devices, the server 110 is a management device for confirming the position of an IoT device by receiving an identifier of an object to be identified from a service user and transmitting the identifier to the IoT device. Since the server 110 is aware of the position of the lighting device, it may determine where the IoT device is located based on a lighting device to which the IoT device transmits a response signal for the visible light signal received by the lighting device. The server 110 generates data including an identifier of the IoT device to be located in the header, and transmits the generated data to the lighting device 120. The lighting device 120 may be implemented as various lights such as a fluorescent lamp, an LED, and the like. The lighting device 120 analyzes the data received from the server 110, regenerates data including only the identifier of a specific IoT device such that only the specific IoT device responds, and transmits the data to the IoT device. Since the identifier of the specific IoT device is included in the data, only the specific IoT device responds to the data. The specific IoT device that receives the data from the lighting device transmits response data for the received data. Since the specific IoT device transmits the response data to a specific lighting device, the server may indirectly recognize that the specific IoT device is under the specific lighting device. Accordingly, the server may identify the position of the terminal within a very small error range without using a separate positioning system such as a GPS.

In FIGS. 3, 6A and 10, it is shown that the protocol of the application layer is CoAP, the protocol of the transport layer is UDP, the protocol of the network layer is IP, and the protocol of the datalink layer is MAC. However, the present disclosure is not limited thereto.

Although exemplary embodiments of the present disclosure have been described for illustrative purposes, those skilled in the art will appreciate that various modifications, additions and substitutions are possible, without departing from the spirit and scope of the appended claims. Therefore, the present disclosure is to be construed as illustrative rather than limiting, and the scope of the present disclosure is not limited by the embodiments. The scope of protection of the disclosure should be construed according to the appended claims, and all technical ideas within the scope of the claims and equivalents thereto should be construed as being within the scope of the disclosure.

What is claimed is:

1. A server for controlling a lighting device preconfigured to transmit data to a preconfigured terminal, the server comprising:
    a database configured to store an identifier of one or more lighting devices used for visible light communication and an identifier of a terminal;
    a data generator configured to generate data of a physical layer comprising a VLC Device Management Protocol (VDMP) header including an identifier of the preconfigured terminal, information to be transmitted to the preconfigured terminal, and a header of a higher layer;
    a controller configured to check the identifier of the preconfigured terminal in the database and controlling the data generator to generate the data of the physical layer including the identifier of the preconfigured terminal; and
    a communication unit configured to transmit the data of the physical layer to the preconfigured lighting device under control of the controller.

2. The server of claim 1, wherein, in storing the identifier of each of the one or more lighting devices stored in the database, the database matches the identifier of a terminal located within a coverage of a visible light signal of each of the lighting devices with the identifier of each of the lighting devices.

3. The server of claim 2, wherein, in storing the identifier of each of the terminals, the database matches a service identifier for each visible light communication service used by each of the terminals with the identifier of each of the terminals.

4. The server of claim 1, wherein the VDMP header comprises
    a data type field, a flag field, a target node field, a lighting identity (ID) field, a device ID field, a service ID field, and a sequence number field.

5. The server of claim 2, wherein the controller checks the identifier of a lighting device stored in the database by being matched with the identifier of the preconfigured terminal included in the data of the physical layer, and controls the communication unit to transmit the data of the physical layer to the lighting device having the checked identifier.

6. A visible light lighting device comprising:
    a communication unit configured to receive, from a visible light communication (VLC) server, data of a first physical layer to be transmitted to a preconfigured terminal;
    a data analyzer configured to divide the data of the first physical layer into a header of a higher layer of the first physical layer, information to be transmitted to the preconfigured terminal, and a VLC Device Management Protocol (VDMP) header including an identifier of the preconfigured terminal, and analyzes the VDMP header to check the information included in the VDMP header;
    a data generator configured to regenerate data of a second physical layer comprising a VLC header including a part of information included in the VDMP header and the information to be transmitted to the preconfigured terminal;
    a controller configured to control the data generator to regenerate the data of the second physical layer comprising the part of the information included in the VDMP header and to control the data of the second physical layer to be transmitted; and
    a lighting unit configured to modulate the data of the second physical layer into the visible light signal under control of the controller.

7. The visible light lighting device of claim 6, wherein the data analyzer analyzes a data type field, a flag field, a target node field, a lighting identity (ID) field, a device ID field, a service ID field, and a sequence number field in the VDMP header to check information contained in each of the fields.

8. The visible light lighting device of claim 7, wherein the data generator determines whether to regenerate the data of the second physical layer by checking the target node field.

9. The visible light lighting device of claim 7, wherein the data generator regenerates a VLC header including the data type field, the target node field, the lighting ID field, the device ID field, the service ID field, and the sequence number field among the fields in the VDMP header.

* * * * *